United States Patent
Whittenberger et al.

(10) Patent No.: US 7,565,743 B2
(45) Date of Patent: Jul. 28, 2009

(54) METHOD FOR INSERTION AND REMOVAL OF A CATALYTIC REACTOR CARTRIDGE

(75) Inventors: William A. Whittenberger, Leavittsburg, OH (US); David A. Becker, Hiram, OH (US); Randy Bartos, Ravenna, OH (US)

(73) Assignee: Catacel Corp., Garrettsville, OH (US)

( * ) Notice: Subject to any disclaimer, the term of this patent is extended or adjusted under 35 U.S.C. 154(b) by 843 days.

(21) Appl. No.: 11/105,974

(22) Filed: Apr. 14, 2005

(65) Prior Publication Data
US 2006/0245982 A1    Nov. 2, 2006

(51) Int. Cl.
B21D 51/16    (2006.01)
B23P 19/04    (2006.01)

(52) U.S. Cl. .................. 29/890; 29/890.031; 29/426.1; 29/426.3; 29/726; 29/244; 29/283; 29/284

(58) Field of Classification Search ............... 29/402.01, 29/402.08, 402.11, 890, 890.031, 890.03, 29/426.1, 426.3, 426.5, 723, 267, 270, 271, 29/272, 283, 284, 244, 726; 138/177, 96 R
See application file for complete search history.

(56) References Cited

U.S. PATENT DOCUMENTS

| | | | | |
|---|---|---|---|---|
| 2,503,426 A | * | 4/1950 | Tower | 29/283 |
| 2,537,368 A | * | 1/1951 | Northrop | 623/57 |
| 4,162,290 A | | 7/1979 | Crawford | |
| 4,211,446 A | * | 7/1980 | Shultz, Sr. | 294/26 |
| 4,273,681 A | | 6/1981 | Nonnenmann | |
| 4,400,309 A | | 8/1983 | McMahon | |
| 4,713,234 A | | 12/1987 | Weirich | |
| 4,830,834 A | | 5/1989 | Stahl | |
| 4,844,837 A | | 7/1989 | Heck | |
| 5,004,592 A | | 4/1991 | Pinto | |
| 5,039,510 A | | 8/1991 | Pinto | |
| 5,096,111 A | | 3/1992 | Ishikawa et al. | |
| 5,141,276 A | * | 8/1992 | McClure | 294/92 |
| 5,278,125 A | | 1/1994 | Iida et al. | |
| 5,300,275 A | | 4/1994 | Lywood | |
| 5,925,328 A | | 7/1999 | Stahl | |
| 5,932,141 A | | 8/1999 | Rostrop-Nielsen | |

(Continued)

FOREIGN PATENT DOCUMENTS

EP    575170 A1 * 12/1993

(Continued)

Primary Examiner—Jermie E Cozart
(74) Attorney, Agent, or Firm—Pearne & Gordon LLP (57) ABSTRACT

A reactor cartridge includes a plurality of spaced-apart monoliths, formed along a tube or other mandrel. Each monolith is formed of a pair of flat and corrugated metal strips, spirally wound around the tube. These strips could be made of solid or screen material. The corrugations are skewed, such that the monolith imparts a swirl to gases flowing through it. The corrugations of the strips in adjacent monoliths are oriented differently, so that successive monoliths impart different swirls to the gases, so as to promote mixing of gases and better heat transfer from the exterior to the interior of the cartridge. An insertion and removal tool simplifies the procedure for stacking such cartridges in a long pipe, or for removing cartridges from the pipe. The all-metal construction facilitates heat transfer through the entire reactor, and avoids the problems associated with packed ceramic beds.

20 Claims, 7 Drawing Sheets

U.S. PATENT DOCUMENTS

| | | |
|---|---|---|
| 6,077,459 A | 6/2000 | Laursen |
| 6,249,958 B1* | 6/2001 | Bubino et al. .................. 29/598 |
| 6,274,113 B1 | 8/2001 | Heyse |
| 6,319,877 B1 | 11/2001 | Christensen |
| 6,482,375 B1 | 11/2002 | van der Wal |
| 6,576,158 B1 | 6/2003 | Christensen |
| 6,746,624 B1 | 6/2004 | Christensen |
| 6,780,292 B2* | 8/2004 | Hermann et al. ............ 204/269 |
| 6,990,714 B2* | 1/2006 | Sato et al. ................. 29/402.01 |
| 2002/0148722 A1* | 10/2002 | Hermann et al. ............ 204/242 |
| 2004/0071610 A1 | 4/2004 | Brenner et al. |
| 2008/0028588 A1* | 2/2008 | Rubino et al. ............... 29/426.5 |

FOREIGN PATENT DOCUMENTS

| | | |
|---|---|---|
| JP | 2000-093746 A | 4/2000 |
| WO | WO 00/05168 A1 | 2/2000 |

* cited by examiner

METHOD FOR INSERTION AND REMOVAL OF A CATALYTIC REACTOR CARTRIDGE

BACKGROUND OF THE INVENTION

This invention relates to the field of catalytic combustion and/or heat exchange. The present invention provides a cartridge that can be used as a heat exchanger or a catalytic or non-catalytic reactor, and which can be stacked with similar cartridges in a long tube or pipe. The invention also includes a method of moving a cartridge into or out of a pipe, and a tool for accomplishing such transfer.

The cartridge of the present invention achieves the same objectives as that of the catalyst support described in U.S. patent application Ser. No. 10/896,302, filed Jul. 21, 2004, now U.S. Pat. 7,320,778, the disclosure of which is incorporated by reference herein.

One of the objectives of the above-cited application is to avoid the problems associated with the use of ceramic materials in the manufacture and operation of catalytic reactors. Packed bed ceramic catalysts have the disadvantage that they have low thermal conductivity, making it difficult to transfer heat from the periphery of the reactor to the inside. Also, the thermal mismatch between the metal and ceramic portions of prior art reactors eventually leads to pulverization of the ceramic material, thus limiting the useful life of the reactor. Like the device described in the above-cited application, the present invention also comprises an all-metal structure which inherently avoids these problems.

Another object of a catalytic reactor or heat exchanger is to provide adequate mixing of gas streams so as to promote heat transfer between the wall of the reactor and the gases flowing therein. Thus, in the application cited above, skewed or angled corrugations define curved paths which impart a swirl to gases as they exit the reactor. The present invention also provides a structure that promotes mixing and/or swirling of gases.

The cartridge of the present invention can be used, for example, in the field of catalytic fuel reforming, to make hydrogen, which is then used in generating electricity through a fuel cell, or in other industrial processes such as oil and gas refining, ammonia and fertilizer production, hydrogenation of oils and chemicals, and iron ore reduction. The cartridge could be used as a catalytic or non-catalytic combustor. The cartridge could also be used as a simple heat exchanger.

SUMMARY OF THE INVENTION

In one preferred embodiment, the present invention comprises a cartridge having a plurality of spaced-apart monoliths, each monolith defining channels for gas flow, each monolith imparting a swirl to gases flowing through the channels. Adjacent monoliths impart swirls that have different directions. In particular, the direction of swirl of the gas is reversed from one monolith to the next. This reversal causes turbulence in the mixing areas between monoliths, and enhances heat transfer between the exterior and the interior of the monoliths.

The monoliths are preferably formed of pairs of flat and corrugated metal strips, the strips being wound around a mandrel, such as a tube or rod, to define a spiral structure. Each corrugated strip has corrugations that are oblique to the longitudinal axis of the strip. The oblique orientation of the corrugations is what imparts the swirl to the gases. The spaces between monoliths comprise mixing areas for gas. Retainers may be inserted in these spaces, to help maintain the spacing and to prevent telescoping of the layers of the monoliths, due to pressure of the gas stream. The strips may be conventional metal foil strips, or they may be made of a fine-pitch screen, to allow additional mixing and heat transfer by radiation.

The invention also includes a method of making a catalytic combustor cartridge. In this method, one affixes pairs of flat and corrugated metal strips, at spaced-apart locations along a mandrel, and winds the pairs of strips around the mandrel, such as by turning the mandrel on its longitudinal axis, to form a plurality of spaced-apart, spirally-wound monoliths. The corrugated strips are formed with corrugations that are oblique to the longitudinal axis of the strip. If the cartridge is to be used as a catalytic combustor, the strips can be coated with a suitable catalyst before they are wound to form the monoliths. The monoliths can then be placed in an enclosure, such as a screen. Retainers may also be placed between adjacent monoliths.

Another aspect of the invention is a method of inserting a reactor cartridge into a pipe, and of removing said cartridge. An insertion tool is attached to an end of the cartridge, and the cartridge is extracted from, or inserted into, a pipe, which may be, in general, many times longer than the cartridge. The insertion tool is then disengaged from the cartridge. The insertion tool preferably includes a centering device, which centers the tool within the pipe, and at least one hook which engages a lifting pin, or other structure, on the cartridge.

The invention also includes the insertion and removal tool mentioned above. This tool includes a centering device, a connector, attached to the centering device and capable of engaging a reactor cartridge, and a shaft connected to the centering device. The centering device may comprise a brush, or a cage having rollers, or some other generally cylindrical structure that fits reasonably snugly within the pipe holding the cartridge. The connector preferably includes one or more hooks, adapted to engage a lifting pin, or its equivalent, affixed to the cartridge.

The present invention therefore has the primary object of providing a reactor cartridge that can be used in catalytic or non-catalytic combustion, or for catalytic reforming, or for other endothermic or exothermic catalytic reactions, or for simple heat exchange.

The invention has the further object of providing an all-metal reactor cartridge, having a plurality of monoliths, wherein the cartridge can be stacked, with other similar cartridges, in a long pipe.

The invention has the further object of providing a reactor cartridge which promotes rapid heat transfer throughout the cartridge, and which avoids the problems associated with the use of a packed ceramic bed.

The invention has the further object of providing a method of making a reactor cartridge.

The invention has the further object of providing a method of inserting a reactor cartridge into a pipe, so as to create a stack of such cartridges.

The invention has the further object of providing a method of removing a reactor cartridge from a stack in a pipe.

The invention has the further object of providing a tool for inserting a reactor cartridge into a pipe, or for removing a cartridge from the pipe.

The reader skilled in the art will recognize other objects of the invention, from a reading of the following brief description of the drawings, the detailed description of the invention, and the appended claims.

DETAILED DESCRIPTION OF THE INVENTION

Figure 1:
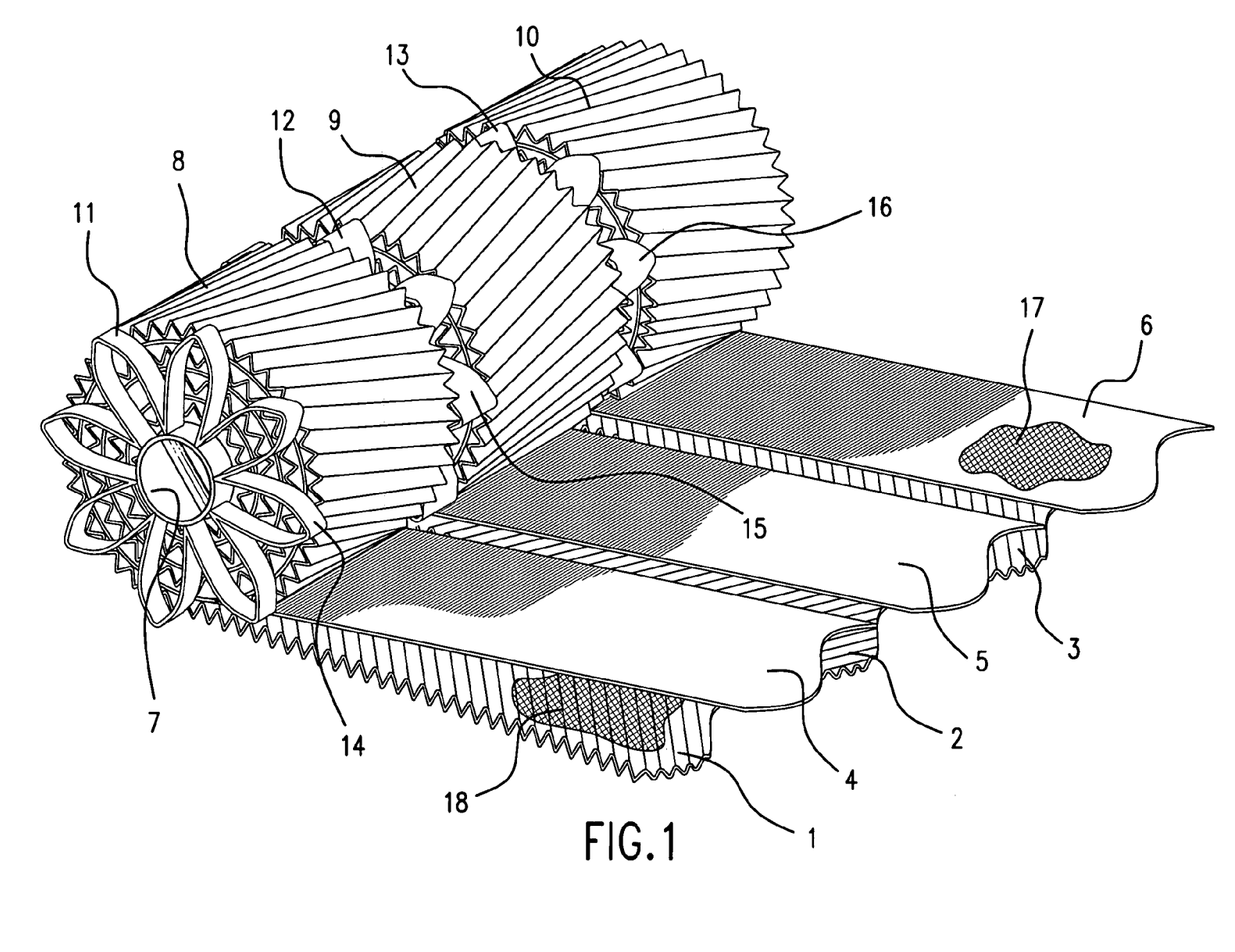
FIG. 1 provides a perspective view of a portion of a cartridge made according to the present invention, showing the fabrication of the cartridge by winding flat and corrugated strips around a tube or mandrel.

FIG. 1 illustrates the basic structure, and method of manufacture, of the reactor cartridge of the present invention. The cartridge is made from a plurality of corrugated strips 1, 2, 3 and a plurality of flat strips 4, 5, 6. The corrugated strips have skew corrugations, i.e. their corrugations are oblique relative to the longitudinal axis of the strip. The strips, which are preferably made of metal foil, are welded to, and wound around, tube 7, so as to produce three monoliths, designated by reference numerals 8, 9, and 10. The monoliths are also called "honeycombs", because they present a multiplicity of channels to gases flowing generally axially therethrough. Each of the above channels is defined by a portion of a flat strip and a portion of an adjacent corrugated strip.

Before assembly, the corrugated strips are oriented such that the corrugations of adjacent strips are non-parallel. This orientation is achieved simply by reversing the orientation of every other corrugated strip, before the strips are wound into monoliths. This reversal is visible in FIG. 1, which shows that the corrugations of strips 1 and 3 are parallel to each other, but non-parallel to the corrugations of strip 2.

As a consequence of the latter arrangement, adjacent monoliths in the finished structure define differently-oriented channels for gas flow. More particularly, when the strips are wound, the skew corrugations define curved or spiral channels, and the direction of the curve or spiral in a given monolith is different from that of either of the adjacent monoliths.

When the winding is complete, the resulting structure comprises a cartridge having a plurality of monoliths. Only three monoliths are shown in FIG. 1, for simplicity of illustration, but other numbers of monoliths could be provided in each cartridge, by attaching more or fewer pairs of flat and corrugated strips to the tube 7.

Figure 7:
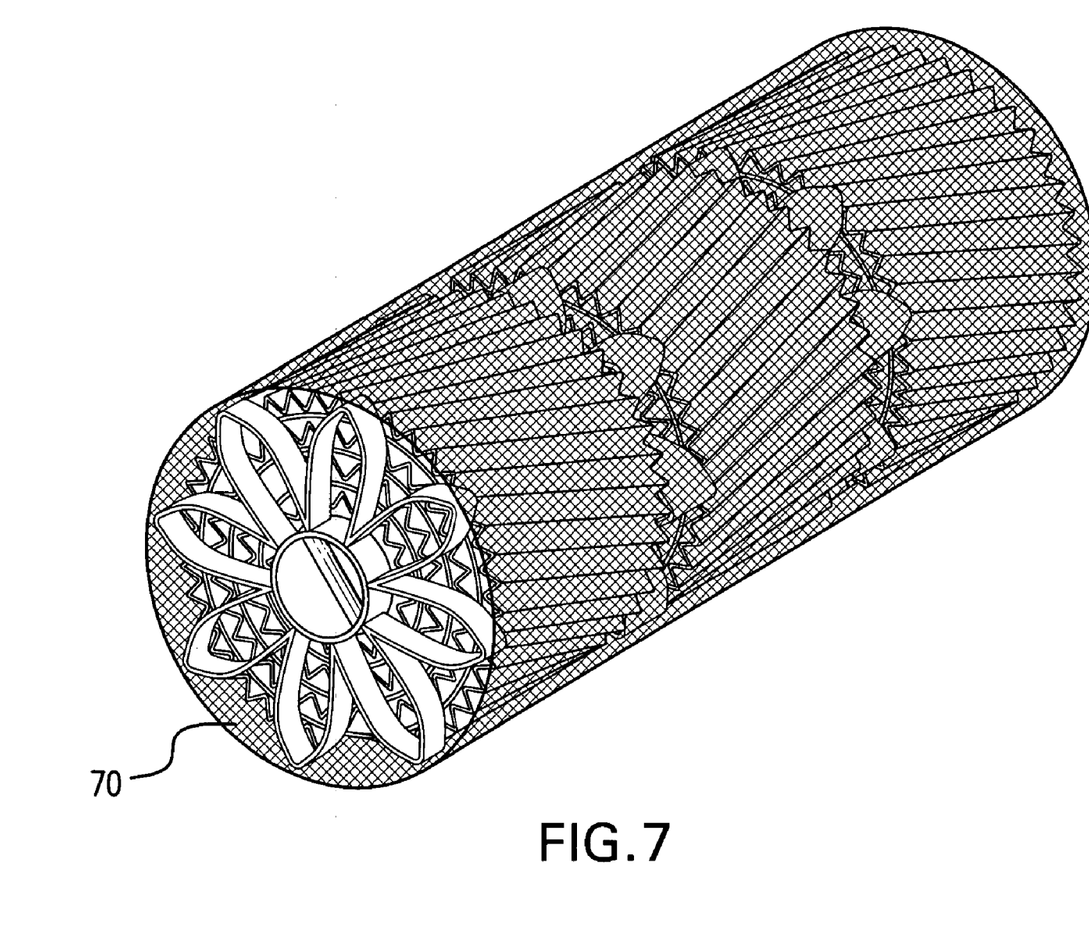
FIG. 7 provides a perspective view of a cartridge made according to the present invention, the cartridge being enclosed within a screen material.

The wound structure is preferably enclosed within screen material 70, as shown in FIG. 7. The screen material protects the monoliths and helps to hold them together. The screen may have a mesh that is relatively fine, comparable to that used in making a conventional window screen, or it may be relatively coarse, similar to what is used in making a rabbit cage or a chicken coop, i.e. having a mesh size of the order of 0.25 inches. A more coarse mesh has the advantage of allowing better heat transfer, and is therefore preferred, but the invention is intended to include both coarse and fine mesh sizes.

The material comprising the corrugated and/or flat strips may itself be made of a screen. In this case, the mesh size must be relatively small, such as of the order of about 0.05 inches or smaller, so that the material will have enough surface area to support a catalyst coating.

FIG. 1 indicates that flat strip 6 could be made of a screen material, as shown by fragmentary screened portion 17. Similarly, corrugated strip 1 could be made of a screen material, as shown by fragmentary screened portion 18. Instead of being made of an actual screen, the strips could comprise foil that is riddled with holes. The term "screen" is therefore intended to include the case in which at least one of the strips is formed with a multiplicity of holes.

In summary, the flat and corrugated strips could both be made of solid material, or they could both be made of a screen, or the flat strips could be solid and the corrugated strips could be screened, or vice versa. FIG. 1 is intended to include all possible combinations, wherein any or all of the flat and/or corrugated strips may be of solid or screen material. All such combinations are included within the scope of the invention.

The advantage of the use of a screen, for the flat and/or corrugated strips, is that the screen promotes cross-channel flow and heat transfer, and also promotes heat transfer by radiation.

The monoliths 8, 9, and 10 are separated by retainers 11, 12, and 13. In a preferred embodiment, the retainers have the form of the "spiders" shown in FIG. 1. The spiders are made of a flat strip of metal, as shown. Spiders 12 and 13, which sit between monoliths, have a width that is twice the width of spider 11, which is located at the end of the cartridge. The reason for the latter feature is that, when cartridges are stacked end-to-end in a cylindrical pipe, the widths of the spiders at the ends of adjacent cartridges together equal the widths of the internal spiders, thereby preserving a uniform spacing between all adjacent monoliths in the stack.

In addition to helping to preserve the spacing between monoliths, the retainers also prevent the layers from telescoping into one another, due to the pressure of gas flowing through the cartridge. Other means for preventing telescoping, which are known in the art, can be used instead of spiders.

Each spider is defined by a plurality of petals, such as those designated by reference numerals 14, 15, and 16. The petals of adjacent spiders are intentionally positioned out of phase with each other, to produce even more turbulence in the mixing areas, so as to promote better heat transfer throughout the body of the cartridge.

The tube 7 serves as a mandrel upon which the flat and corrugated strips can be wound into a spiral structure. It also helps to anchor the monoliths in a spaced-apart condition, because the pairs of strips are welded to the tube. The monoliths are therefore held at spaced-apart locations both by the welding of the strips to the tube, and by the retainers.

Instead of a tube, one could use a solid rod. A tube is preferred because it more readily accommodates an insertion and removal tool, described below. If a tube is used, it should be blocked off, preferably by providing a partition or plug at or near the center of the tube, to prevent gas from traveling through the tube. That is, the tube is intended as a structural member and not as a gas conduit.

The cartridge of the present invention thus includes a plurality of monoliths arranged in series. The spaces between the monoliths, partially occupied by the retainers, comprise regions in which gases, exiting the various channels defined by the monoliths, can mix. The skewed corrugations define curved channels in the monolith, imparting a swirl to the gases exiting the monolith. Also, because the direction of the skew is reversed from one monolith to the next, the swirl direction is also reversed with each successive monolith. This reversing effect creates turbulence in the mixing space, promoting heat transfer between the various gas streams, and also between the outer wall of the pipe containing the cartridge and the gas streams.

In one embodiment, the monoliths have an axial length of about 2 inches, and a diameter of about 4-6 inches, with a mixing space in the range of 0.25-0.50 inches. More generally, and depending on the flow conditions, the length may be in the range of about 2-6 inches, the diameter may be in the range of about 3-7 inches, and the spacing may be in the range of about 0.12-1.0 inches. The monoliths are formed by winding the flat and corrugated strips around a tube or rod that has a diameter of about 0.75-2.0 inches. A plurality of such monoliths are conveniently arranged in a cartridge that is about 3-6 feet long. The numerical values given herein are only by way of example, and are not intended to limit the invention to any particular size or dimension.

In a more specific example, the tube could be 40 inches long, and the strips could be 2 inches wide. If the spacing between adjacent strips (monoliths) is 0.5 inches, one can form 16 monoliths along the tube or rod. That is, there would be 16 monoliths in the cartridge, with 8 imparting a clockwise swirl and 8 imparting a counterclockwise swirl.

In the reactor pipe, the cartridges are stacked one upon the other, to fill the height of the pipe, which may be about 30-40 feet. The cartridges may be anchored to a structural member, such as a rod, in the center of the pipe.

The above dimensions are given only as examples, and are not intended to limit the invention. The components of the cartridge of the present invention can be scaled up or down, with an infinite variety of dimensions, to suit the needs of a particular application. The present invention is intended to include all such variations.

Because the length of a cartridge of the present invention is, in general, much less than the length of the reactor pipe, it is necessary to provide a tool to facilitate insertion and removal of the cartridge. Each cartridge preferably includes a grasping feature in the center, for engagement with a mating feature in an insertion and removal tool. The grasping feature may be a thread, a T-slot, or some other structure. The grasping feature may be formed in the tube, or it may be defined by the retainer or spider. The insertion tool permits the cartridge to be lowered into the pipe, and to be removed from the pipe when necessary. Specific embodiments of the insertion tool are described later in this specification.

In summary, the preferred method of assembly of the catalytic reactor cartridge of the present invention is as follows. One starts with a rod or blocked tube, such as tube 7. Next, one prepares a plurality of flat and corrugated strips, the corrugations being skewed. As noted above, some or all of these strips may comprise a screen material or a solid material. If the cartridge is to be used to conduct catalytic reactions (and not to be used, for example, as a simple heat exchanger), a catalyst coating is then applied to the strips. The coated corrugated and flat strips are tack welded to the tube, spaced apart so as to preserve the desired spacing between monoliths. The tube is then turned about its longitudinal axis, causing the strips to become wound onto the tube, forming monoliths. The strips are configured such that when the monoliths are completed, the outer layer is corrugated. A retainer, such as a spider, may be inserted between adjacent monoliths.

The resulting cartridge, which so far comprises a center rod or tube with multiple monoliths, may be wrapped with a screen material, as shown in FIG. 7, the screen having a coarse or fine mesh. The screen used to wrap the monoliths is different from the screen material which may have been used to make some or all of the flat and corrugated strips. Optionally, the screen used to enclose the cartridge may itself have a catalytic coating. This external screen material secures the monoliths, and prevents them from unwinding, and also reduces the risk of damage to the monoliths during cartridge insertion or removal. The screen also allows gas from inside the cartridge to contact the walls of the reactor pipe. The cartridge may then be finished by adding retainers, such as the illustrated spiders, or similar protective features.

The present invention also includes an insertion and removal tool, for inserting or removing the cartridge from a long pipe. The problem to be addressed is how to extract a cartridge, made as described above, from a long pipe, which may be 40 feet in length. The cartridges are stacked end-to-end in the pipe. Because the pipe may have a very small diameter (of the order of 4-6 inches) relative to its length, the line-of-sight visibility into the pipe is very limited. In many or most cases, it may be necessary to insert or remove cartridges from the pipe without any visual feedback. The insertion tool must also be able to work in any orientation.

The connection made between the insertion and removal tool, and the cartridge, must be such that the two cannot become separated during the extraction process. Significant pulling and twisting forces may need to be applied to break the cartridge free from the wall of the pipe.

Therefore, the insertion and removal tool, used in the present invention, comprises three components:

1) a centering device for maintaining alignment with the center tube of the stackable reactor;

2) a connector that engages the tool with the stackable reactor cartridge; and 3) a shaft used to insert and retrieve the tool.

Figure 2:
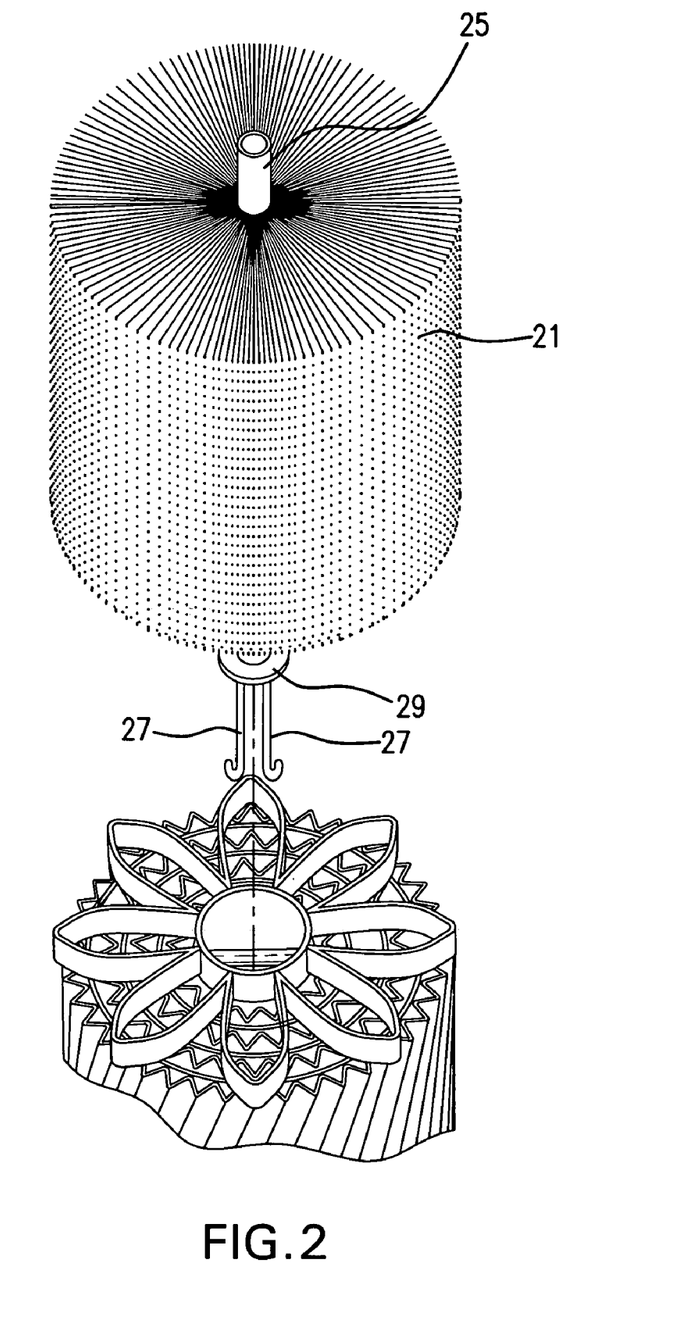
FIG. 2 provides a fragmentary perspective view, showing an insertion and removal tool for use with the cartridge of the present invention.
Figure 3:
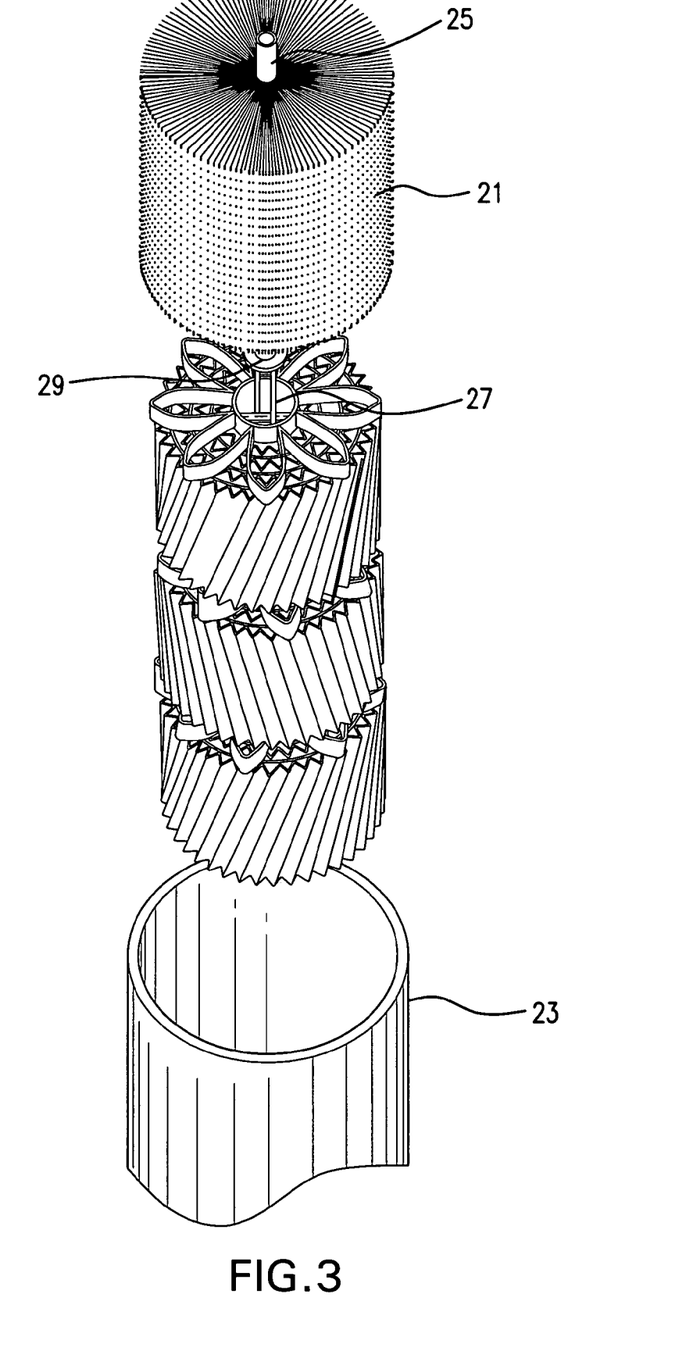
FIG. 3 provides a fragmentary perspective view of the tool of FIG. 2, showing the tool being used to insert or remove a cartridge of the present invention, from a pipe.
Figure 4:
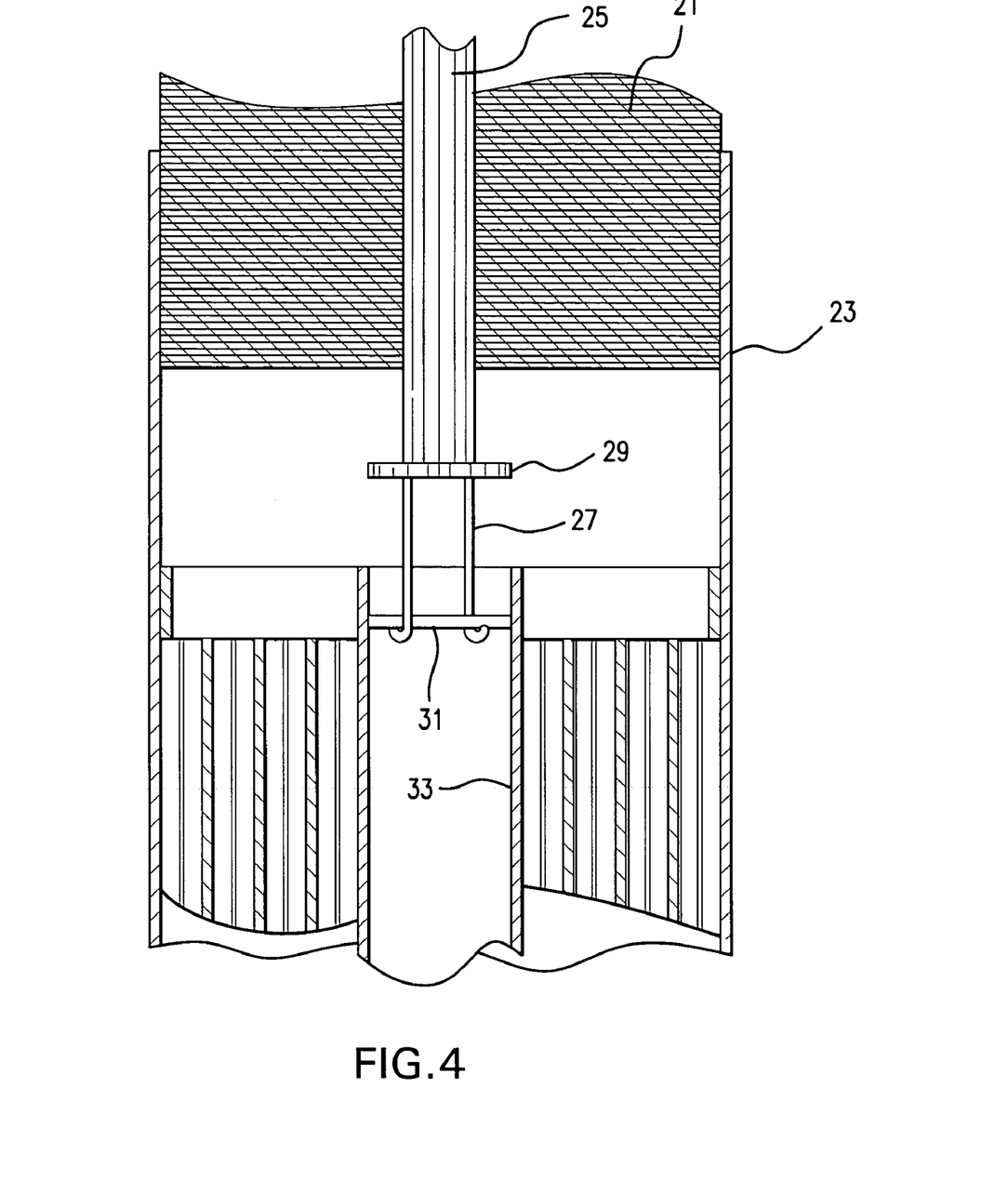
FIG. 4 provides a cross-sectional view of the insertion and removal tool, showing the tool in engagement with the end of a cartridge made according to the present invention.
Figure 5:
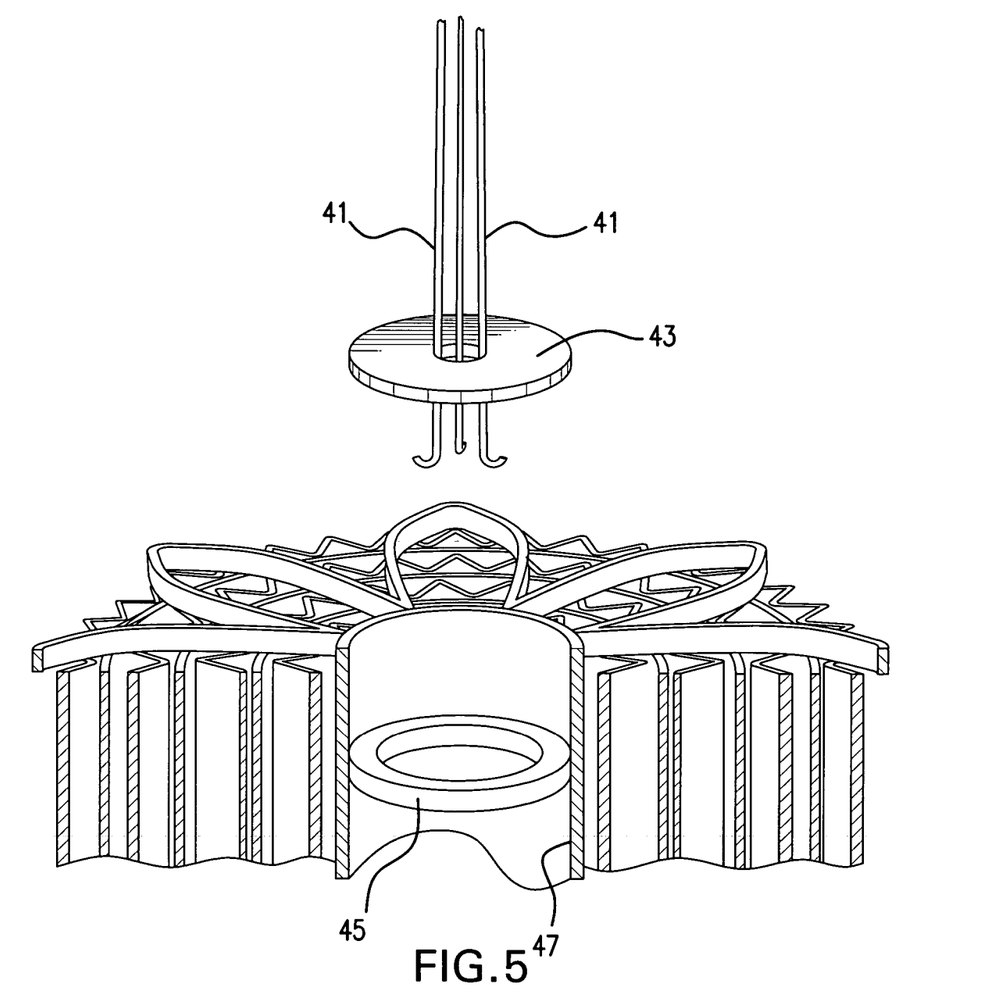
FIG. 5 provides a fragmentary perspective view showing an insertion and removal tool, made according to an alternative embodiment of the present invention, the tool being in proximity with the cartridge to be inserted or removed.
Figure 6:
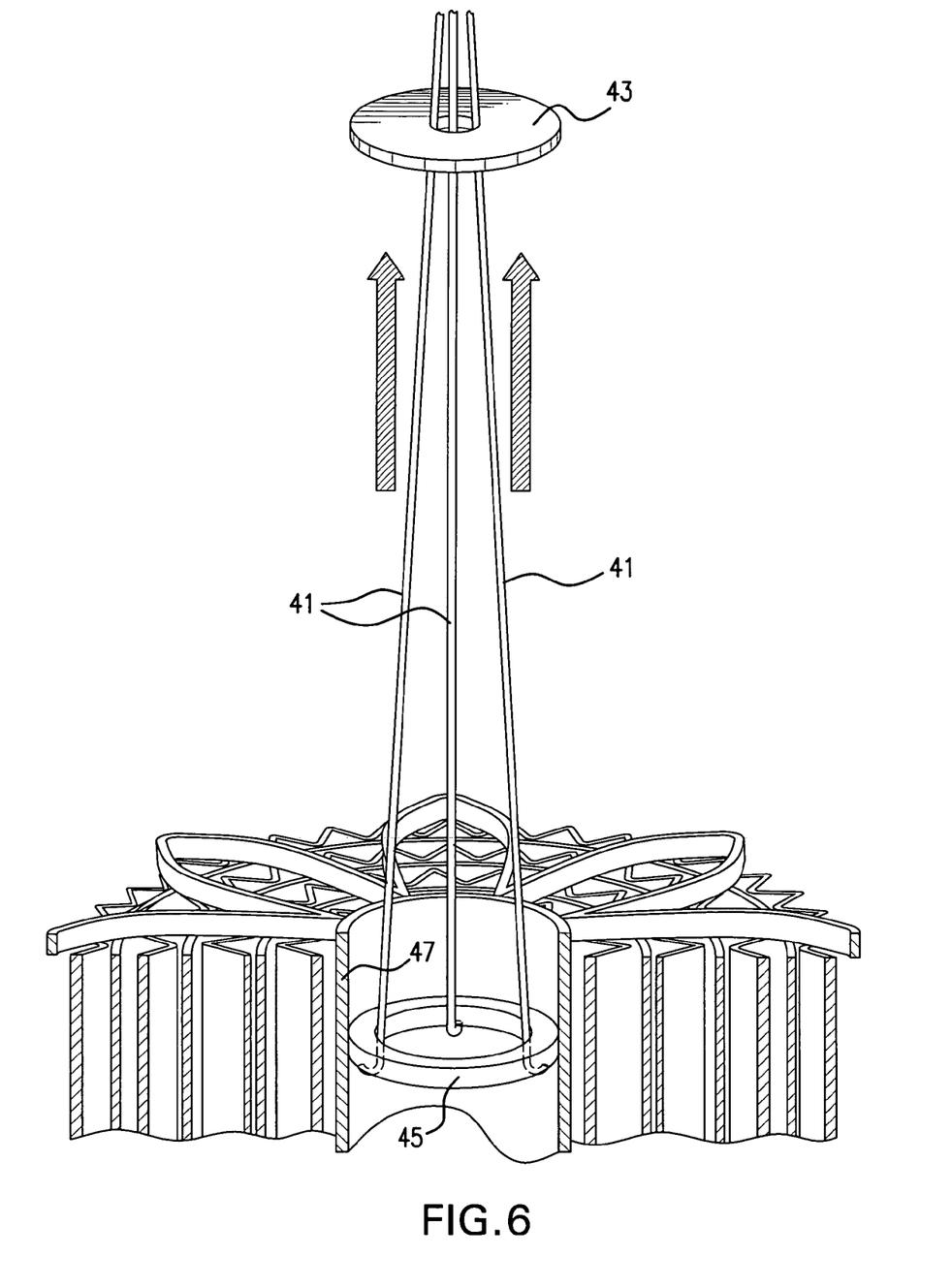
FIG. 6 provides a fragmentary perspective view of the tool of FIG. 5, showing the tool in engagement with the cartridge, and showing the tool being used to lift the cartridge.

The preferred constructions of the connectors of the present invention comprise a double fishhook structure and a triple fishhook structure. FIGS. 2-4 illustrate the double fishhook structure, and FIGS. 5-6 show the triple fishhook structure.

Consider first the embodiment of FIGS. 2-5. The centering device shown in this embodiment is a brush 21. The brush may be a standard chimney flue brush, which has been modified to accept the connector structures described below. The diameter of the brush is chosen so that it easily but snugly fits within the pipe containing the reactor cartridge. The brush has a longitudinal axis which substantially coincides with the longitudinal axis of the pipe. Thus, when inserted into pipe 23 (see FIGS. 3 and 4), the brush maintains the alignment of the shaft 25 with the longitudinal axis of the pipe. One advantage of the use of a brush is that it will clean the walls of the pipe as it is inserted, thus easing the extraction of the cartridges.

The centering device can assume other forms. For example, one could use a cylindrical cage (not shown) having two spoked "wheels" at each end. The length of the cage should be at least as great as its circumference. The total diameter of the cage and the rollers must be slightly less than the diameter of the pipe into which the cartridges are inserted. The cage would be connected between the shaft and the connector. The advantage of the cage is that it can be moved in either direction, within the pipe, without resistance. The bristles of the brush 21, on the other hand, tend to resist a change of direction.

As noted above, FIGS. 2-4 illustrate the embodiment wherein the connector comprises a double fishhook. In particular, these figures show J-shaped fishhooks 27. The fishhooks are attached to annulus 29. The annulus preferably has threads in its center for easy connection to the centering device. The fishhooks 27 may be formed from pins that are formed into a J-shape, the pins being attached to opposite sides of the annulus, as shown.

The double fishhooks 27 engage a lifting pin 31, most clearly visible in FIG. 4. The lifting pin is preferably attached across the diameter of the tube 33 which supports the monoliths defining the cartridge. In this embodiment, it is assumed that a hollow tube is used. If the tube were replaced by a solid rod, the lifting pin could not be used. Instead, the fishhooks could be designed to grasp some other element, such as the retainer or spider.

Engagement of the insertion and removal tool is accomplished as follows. The tool is inserted into the pipe, and pushed towards the closest reactor cartridge. When the tool encounters the nearest cartridge, it is given a clockwise twist. If the fishhooks are resting against the lifting pin, rotation of the tool will cause the fishhooks to slip below the lifting pin. Also, rotation causes the fishhooks to slip past the pin so that the annulus can seat firmly against the end of the monolith. After the tool is so twisted, the tool is pulled upward. This motion engages the two fishhooks and the lifting pin. The fishhooks create a positive engagement in either direction of rotation, such that the reactor cartridge can be extracted. Disengagement of the tool from the cartridge can be accomplished by reversing the order of the above steps.

FIGS. 5 and 6 show the embodiment wherein the connector comprises a triple fishhook. This connector comprises three individual fishhooks 41, each having the shape of a "J". The hooks are bent outward from the center such that a washer 43 slipped over the combined shanks will compress the hooks. A thick washer 45 is welded into the center support tube 47 of the cartridge. When the assembly comprising the washer 43 and fishhooks 41 is pushed into the reactor cartridge, the washer 43 seats against tube 47. As the fishhooks are pushed further towards the cartridge, the fishhooks are allowed to spring open, thereby allowing the hooks to engage the thick washer. When the extraction tool is pulled away from the cartridge, as illustrated in FIG. 6, the cartridge is pulled away with the tool, due to the engagement of the hooks with the thick washer. The hooks can be disengaged from the thick washer by pushing washer 43 towards the hooks, thereby compressing the hooks and releasing them from engagement with the thick washer.

The shaft used to make the insertion and removal tool can be a standard chimney-brush shaft. This shaft is made in sections, threaded at each end, so that it can be inserted and extended as needed. The sections can be removed as the shaft is pulled out of the pipe, to make handling easier. The invention is not limited to the above-described construction of the shaft; other arrangements can be used, within the scope of the invention.

Although the invention has been described mainly in the context of catalytic combustion or other catalytic reactions (such as steam reforming), it should be understood that the disclosed cartridge is not limited to use in catalytic reactions. The cartridge of the present invention can be used to promote conventional combustion, or it can be used as a simple heat exchanger. Likewise, the insertion and removal tool is not limited to use in the field of catalytic or conventional combustion. The term "reactor" is used in this specification to refer to all of the above-described possibilities.

The invention can be modified in various ways. As noted above, the dimensions of the strips can be varied, and the number of monoliths in each cartridge can be changed. The angle of the skew of the corrugations can be varied. The retainers are not limited to the spiders shown, but could be replaced by equivalent devices, or in some cases, omitted entirely. These and other modifications, which will be apparent to those skilled in the art, should be considered within the spirit and scope of the following claims.

What is claimed is:

1. A method of inserting a reactor cartridge into a pipe, the cartridge comprising a generally cylindrical structure which includes a plurality of spaced-apart monoliths, the method comprising: a) attaching an insertion tool to an end of the cartridge, b) lowering the cartridge, while the cartridge remains attached to the insertion tool, into the pipe, and c) detaching the insertion tool from the cartridge, wherein the insertion tool is selected to include a centering device which fits within the pipe, and at least one hook, and wherein the attaching step comprises engaging the hook with a lifting pin connected to the cartridge.

2. The method of claim 1, wherein steps (a) through (c) are repeated for a plurality of cartridges.

3. The method of claim 1, wherein steps (a) through (c) are repeated until the pipe is substantially filled with cartridges.

4. The method of claim 1, wherein the centering device is selected to comprise a brush.

5. The method of claim 1, wherein the insertion tool comprises a plurality of hooks, and wherein the attaching step comprises engaging said hooks with the cartridge.

6. The method of claim 1, wherein the detaching step includes twisting the insertion tool until the tool becomes disengaged from the cartridge.

7. The method of claim 1, wherein, in step b), the cartridge is lowered at least 20 feet into the pipe.

8. A method of removing a plurality of reactor cartridges from a pipe, each of said cartridges comprising a generally cylindrical structure, the method comprising: a) inserting an insertion tool at least 20 feet into said pipe and then attaching the insertion tool to an end of a first one of said cartridges, b) lifting said first cartridge, while said first cartridge remains attached to the insertion tool, from the pipe, c) detaching the insertion tool from said first cartridge, d) inserting the insertion tool at least 20 feet into said pipe and then attaching the insertion tool to an end of a second cartridge, e) lifting said second cartridge, while said second cartridge remains attached to the insertion tool, from the pipe, and f) detaching the insertion tool from the second cartridge, wherein the insertion tool comprises a centering device which fits within the pipe, and at least one hook, and wherein each attaching step comprises engaging the hook within the cartridge.

9. The method of claim 8, wherein the centering device is selected to comprise a brush.

10. The method of claim 8, wherein the insertion tool comprises a plurality of hooks, and wherein the attaching step comprises engaging said hooks with the cartridge.

11. The method of claim 8, wherein the attaching step includes twisting the insertion tool until the tool becomes engaged with the cartridge.

12. A method of removing at least one of a plurality of generally cylindrical reactor cartridges from a pipe, each cartridge including a lifting pin located in a vicinity of a longitudinal axis of the pipe, the method comprising: a) lowering an insertion tool into the pipe, while maintaining the tool centered within the pipe, b) attaching the insertion tool to a lifting pin of an upper one of said cylindrical cartridges, c) lifting the cartridge, while the cartridge remains attached to the insertion tool, from the pipe, and d) detaching the insertion tool from the cartridge.

13. The method of claim 12, further comprising repeating steps (a) through (d) until all cartridges have been removed from the pipe.

14. The method of claim 12, wherein the insertion tool comprises a centering device which maintains a centered orientation of the tool within the pipe.

15. The method of claim 14, wherein the centering device is selected to comprise a brush.

16. The method of claim 12, wherein the insertion tool comprises a hook, and wherein the attaching step comprises engaging said hook with the lifting pin.

17. The method of claim 12, wherein the attaching step includes twisting the insertion tool until the tool becomes engaged with the lifting pin.

18. The method of claim 12, wherein steps (a) through (c) are performed without directly observing an interior of the pipe.

19. The method of claim 12, wherein the insertion tool comprises a plurality of hooks, and wherein the attaching step comprises engaging said hooks with the lifting pin.

20. The method of claim 12, wherein, in step a), the insertion tool is lowered at least 20 feet into the pipe.

* * * * *